Jan. 25, 1927. 1,615,388
H. W. JESPERSEN
MOISTURE EXTRACTING APPARATUS
Filed Dec. 29, 1924
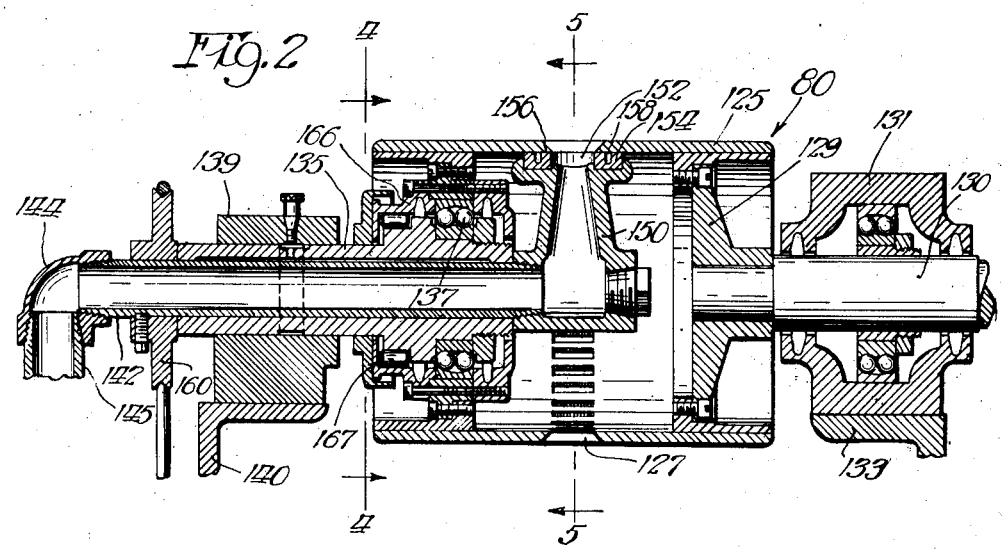
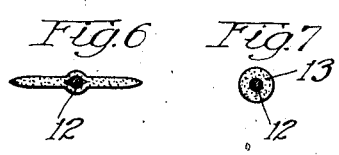
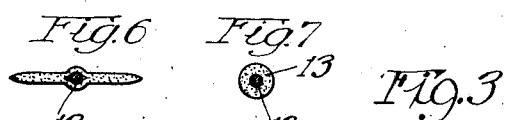
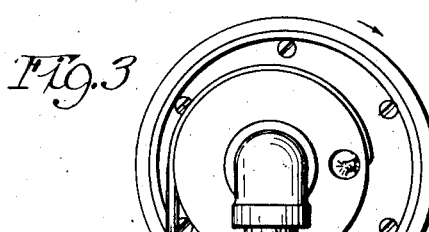
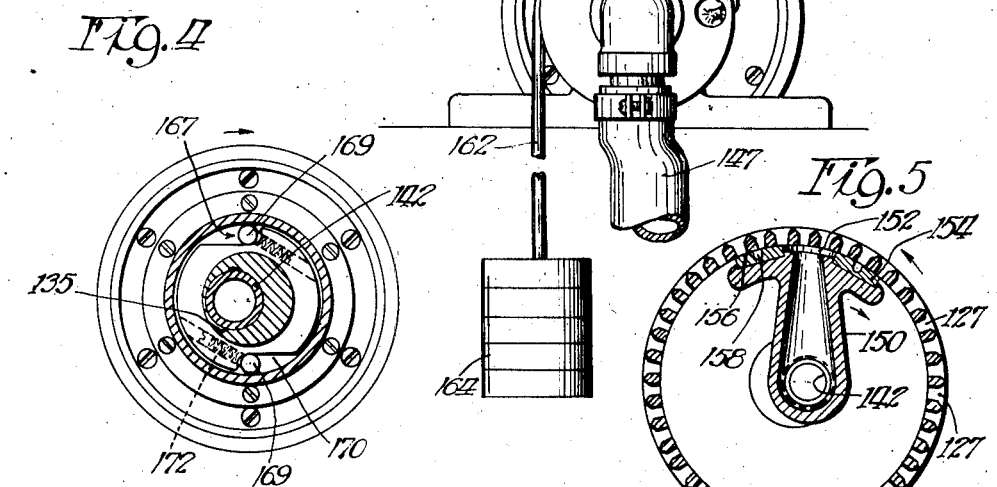
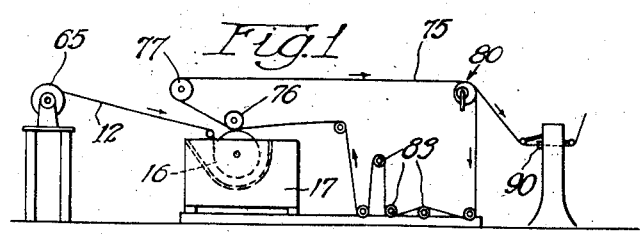
Inventor
Helge W. Jespersen Patented Jan. 25, 1927.

1,615,388

UNITED STATES PATENT OFFICE.

HELGO WIGGO JESPERSEN, OF RIVERSIDE, ILLINOIS, ASSIGNOR TO WESTERN ELECTRIC COMPANY, INCORPORATED, OF NEW YORK, N. Y., A CORPORATION OF NEW YORK.

MOISTURE-EXTRACTING APPARATUS.

Application filed December 29, 1924. Serial No. 758,602.

This invention relates to moisture extracting apparatus, and particularly to a suction-roll for extracting moisture from pulpous material, such as paper-pulp.

The object of the invention is to provide improved apparatus for extracting moisture from material.

One form of the invention is embodied in apparatus of the type shown and described in the copending application of J. S. Little, Serial No. 725,045, filed July 9, 1924. According to the features of the invention, cores in strand form having coatings of moist pulp are carried by a porous belt over a cylindrical roll which is driven by the belt and has perforations arranged to come into close proximity to the inner side of the belt as the roller revolves. Eccentrically mounted with respect to the roller is a pivoted housing having a suction-port which is yieldingly urged toward the inner surface of the roller in such manner that moisture is drawn from the coatings on the cores, through the belt, the perforations, and the suction-port into the housing.

Other features of the invention will become apparent as the following detailed description progresses, reference being had to the accompanying drawings, wherein—

Fig. 1 is a side elevation at a greatly reduced scale of apparatus embodying the invention;

Fig. 2 is a longitudinal section through a suction-roll forming a part of the apparatus shown in Fig. 1;

Fig. 3 is an end elevation of the suction-roll shown in Fig. 2;

Figs. 4 and 5 are sections taken on lines 4—4 and 5—5, respectively of Fig. 2, and Figs. 6 and 7 are enlarged transverse sections which illustrate the manner in which the apparatus shown in Fig. 1 is adapted to apply a coating of pulpous material to a core in strand form.

Referring to Fig. 1, 17 is a tank supplied with liquid containing pulp by any suitable means (not shown) and 16 is a rotatable drum partially immersed in the liquid containing pulp held by the tank 17. The drum 16 is driven by a woven belt 75 which is held in contact with the drum by a felt covered roll 76, the belt being driven by a roller 77 which is in turn driven by any suitable means (not shown). The belt 76 is drawn over a plurality of idlers 83 and over a suction-roll which is designated in general by the reference character 80. A forming mechanism 90 of the type shown and described in the copending application of H. W. Jespersen, Serial No. 713,703, filed May 16, 1924, is driven by any suitable means (not shown). The apparatus is adapted to coat cores in strand form with pulpous material, the operation of the apparatus being as follows: A core 12 in strand form is withdrawn from a supply reel 65 and guided to a foraminous portion of the drum 16 which carries the core through the liquid containing pulp in the tank 17 in such manner that a ribbon of pulpous material is deposited upon the core. The core with its coating of pulp then travels upon the belt 75 over the driven roller 77 and the suction-roll 80, the belt 75 coacting with the felt covered roll 76 to squeeze excess moisture from the pulpous material on the core and to impart the form illustrated in Fig. 6 to such material. Additional moisture is removed from the material by the suction-roll 80 and the core with its coating of pulp then passes to the forming mechanism 90 which wraps the ribbon of pulp around itself and around the core 12 to form a homogenous coating 13 for the core (Fig. 7). The drum 16, the tank 17, the belt 75 and the manner in which the pulpous material is applied to a core in strand form are described in greater detail in the aforementioned copending application of J. S. Little.

Referring to Figs. 2 to 5, inclusive, the suction-roll 80 comprises a cylindrical roller 125 having a plurality of circumferentially arranged perforations 127 and provided at one of its ends with a hub 129 secured to a shaft 130 which is journaled in a bearing 131 mounted upon a frame member 133. At its other end the roller 125 is rotatably journaled upon a sleeve 135 by a ball bearing 137. The sleeve 135 is rigidly secured in a block 139 mounted upon a frame member 140. Journaled in the sleeve 135 is a pipe 142, the longitudinal axis of the pipe being eccentrically disposed with respect to the axis of rotation of the roller 125. Threaded upon the outer end of the pipe 142 is an elbow 144 which together with a pipe section 145 connects the pipe 142 with a flexible tube 147. The flexible tube 147 is operatively connected to any suitable means (not shown) for producing a partial vacuum. Threaded upon the inner end of the pipe 142 is a housing 150 having a suction-port 152 bounded by a resilient gasket 154, which is mounted on the housing 150 and is provided with a surface 156 adapted to engage the interior surface of the roller 125. The surface 156 is grooved as at 158 to aid the gasket 154 in effectively sealing the suction-port 152 from the interior of the roller 125.

Secured to the outer end of the pipe 142 is a sheave 160 to which is secured one end of a cable 162. Secured to the other end of the cable 162 is a weight 164 which tends to rotate the sheave 160, the pipe 142 and the housing 150 in a counterclockwise direction (Fig. 3). Referring to Fig. 5, the weight 164 tends to rotate the housing 150 in a clockwise direction so as to hold the surface 156 in engagement with the interior surface of the roller 125 which is driven in a counterclockwise direction (Fig. 5) by the belt 75.

Interposed between the sleeve 135 and a collar 166 constrained to rotate with the roller 125 is a clutch 167 comprising rollers 169 which are arranged in grooves 170 cut into the sleeve 135 and are urged into contact with the collar 166 by compression springs 172. The construction is such that the roller 125 may revolve freely in a clockwise direction (Fig. 4), but may not be driven in a counterclockwise direction (Fig. 4). This is to prevent injury to the apparatus if for any reason the belt 75 is driven in the wrong direction.

In the operation of the suction-roll 80, the flexible tube 147 is connected to the means (not shown) for creating a partial vacuum so that when the belt 75 carries the core 12 with its coating of pulpous material over the perforations 127, moisture will be drawn from the pulpous material through the belt 75, the perforations 127, the housing 150 and through the pipes 142 and 145 to the means for creating the partial vacuum, after which the moisture may be disposed of in any suitable manner.

What is claimed is:

1. In moisture extracting apparatus, the combination with a rotatable member having a perforated cylindrical wall, of pivoted means eccentrically mounted relative to the member and having a suction-port operatively confined to a single row of perforations in the cylindrical wall.

2. In moisture extracting apparatus, the combination with a rotatable drum having a perforated cylindrical wall, of a tube eccentrically mounted relative to the drum, means having a suction-port carried by said tube, and means for yieldingly holding said means in a position wherein the suction-port operatively registers with the perforations in the cylindrical wall of said drum.

3. In moisture extracting apparatus, the combination with a rotatable member having a perforated cylindrical wall, of means for preventing rotation of the member in a direction opposite to its normal direction of rotation, and means having a suction-port operatively disposed with respect to the perforation in the cylindrical wall.

4. In moisture extracting apparatus, the combination with a rotatable member having a perforated cylindrical wall, of a clutch for preventing rotation of the member in a direction opposite to its normal direction of rotation, pivoted means eccentrically mounted with respect to the member and having a suction-port, and means for yieldingly holding the pivoted means in a position wherein the suction-port operatively registers with the perforation in the cylindrical wall.

5. In moisture extracting apparatus, the combination with a member having a single row of perforations, of means having a suction-port permanently confined to register with said single row of perforations, and means for yieldingly holding the means into firm engagement with said member so that the suction-port is operatively disposed with respect to the perforations in the member.

6. In moisture extracting apparatus, the combination with a drum having a perforated cylindrical wall, of means having a suction-port, resilient means carried by said means operatively associated with the interior surface of said drum, and means comprising a pulley operatively connected to said first recited means, and a weight suspended from said pulley for yieldingly holding the resilient means in contact with the inner surface of the cylindrical wall in a position to register with the perforations therein.

In witness whereof, I hereunto subscribe my name this 16th day of December A. D., 1924.

HELGO WIGGO JESPERSEN.